(12) United States Patent
Menke et al.

(10) Patent No.: US 7,690,501 B2
(45) Date of Patent: Apr. 6, 2010

(54) MODULAR CONVEYOR MAT

(75) Inventors: Cornelis Hendrik Myndert Menke, Delft (NL); Gijsbertus Johannes Verduijn, Terheijden (NL)

(73) Assignee: Rexnord Flattop Europe B.V., Gravenzande (NL)

( * ) Notice: Subject to any disclaimer, the term of this patent is extended or adjusted under 35 U.S.C. 154(b) by 30 days.

(21) Appl. No.: 12/050,377

(22) Filed: Mar. 18, 2008

(65) Prior Publication Data

US 2008/0217142 A1 Sep. 11, 2008

Related U.S. Application Data

(63) Continuation of application No. 10/572,773, filed as application No. PCT/NL2004/000659 on Sep. 23, 2004, now Pat. No. 7,377,380.

(30) Foreign Application Priority Data

Sep. 23, 2003 (NL) .................................. 1024361

(51) Int. Cl.
*B65G 17/08* (2006.01)
(52) U.S. Cl. ...................... 198/851; 198/850; 198/852; 198/853
(58) Field of Classification Search .......... 198/850–853
See application file for complete search history.

(56) References Cited

U.S. PATENT DOCUMENTS

| | | | |
|---|---|---|---|
| 5,174,439 A | 12/1992 | Spangler et al. | |
| 5,181,601 A | 1/1993 | Palmaer et al. | |
| 5,429,227 A | 7/1995 | Krossmann et al. | |
| 6,202,834 B1 | 3/2001 | Layne et al. | |
| 6,223,889 B1 * | 5/2001 | Layne et al. | 198/853 |
| 6,250,459 B1 | 6/2001 | Coen et al. | |
| 6,758,328 B2 | 7/2004 | Arai et al. | |
| 6,814,223 B1 * | 11/2004 | Verdigets et al. | 198/844.1 |
| 7,044,290 B2 | 5/2006 | Garbagnati et al. | |
| 7,073,662 B2 | 7/2006 | Neely et al. | |
| 7,168,557 B2 | 1/2007 | Mitchell | |
| 7,377,380 B2 * | 5/2008 | Menke et al. | 198/851 |

FOREIGN PATENT DOCUMENTS

| | | |
|---|---|---|
| EP | 0878418 A | 11/1998 |
| EP | 1238927 A | 9/2002 |

* cited by examiner

*Primary Examiner*—Douglas A Hess
(74) *Attorney, Agent, or Firm*—Quarles & Brady LLP

(57) ABSTRACT

A conveyor module includes a plurality of first projections extending in a first direction. Each of the first projections include a hinge hole for receiving a first hinge pin. A plurality of second projections extends in a second direction substantially opposed to the first direction. Each of the second projections include a hinge hole for receiving a second hinge pin. A reinforcement bracket nests with at least a portion of one of the second projections. The reinforcement bracket includes a first hinge hole aligned with the hinge holes in each of the first projections for receiving the first hinge pin. The reinforcement bracket further includes a second hinge hole aligned with the hinge holes in the one of second projections for receiving the second hinge pin.

19 Claims, 5 Drawing Sheets

MODULAR CONVEYOR MAT

CROSS-REFERENCE TO RELATED APPLICATIONS

This application is a continuation of application Ser. No. 10/572,773 filed on Nov. 10, 2006, now U.S. Pat. No. 7,377,380 which claims priority to International Application No. PCT/NL04/00659 filed on Sep. 23, 2004, which claims priority to Dutch Patent Application No. 1024361 filed on Sep. 23, 2003, all of which are fully incorporated herein by reference.

STATEMENT REGARDING FEDERALLY SPONSORED RESEARCH OR DEVELOPMENT

Not Applicable

BACKGROUND OF THE INVENTION

The invention relates to a conveyor mat comprising a number of plastic modules successive in a conveying direction, each provided at a front and rear side with a row of projections extending transversely to the conveying direction, provided with hinge holes with recesses located therebetween, the projections cooperating with recesses of successive modules, the hinge loops of adjoining modules being coupled with the aid of hinge pins, reaching through the hinge holes transversely to the transport direction, while hinge pins are included with clearance in oversized hinge holes of projections at the front and/or the rear side.

Such a conveyor mat is generally known and is indicated by the skilled person as modular bend mat or flexmat. As the hinge pins are included with clearance in the hinge holes, the projections can slide into and out of the recesses so that the conveying path to be traveled by the modules of the conveyor mat can make a bend in the conveying plane.

Often, the modules are laid side by side transversely to the conveying direction, so that the width of the mat can be varied in steps. The modules of the mat can be guided along a conveying path. The mat can then negotiate a bend transversely to the conveying plane in that successive modules can pivot about the hinge pins.

When traveling a straight length of the conveying path, the tensile force in the mat is transmitted via the hinge pins over the entire width of the mat from the projections on the edge of one module to the projections on the adjoining edge of the successive module.

A problem that occurs with such modular bend mats is the absorption of the forces during negotiation of the bend.

As the projections and recesses of the modules slide into each other when a bend is negotiated, it is impossible without further measures to transmit the tensile force in the mat via the hinge pin over the entire width of the mat from the projections on one side of the module to the projections on the adjoining side of a successive module. In theory, in the bend, all force will be transmitted via the outermost projections while the projections in the center and the inside transmit no forces. In practice, the flexibility of the modules and the material of the hinge pins can provide for a number of outer projections to contribute to the transmission of forces but still, when the bend is negotiated, an increased load is formed on the outer edge of the mat. This may lead to the mat giving way, which, in practice, often forms a restriction on the usability of the mat.

It has already been suggested to reinforce the projections on the edges of the conveyor mat, for instance by designing them to be thicker and/or by coupling successive hinge pins on the edge of the conveyor mat with the aid of steel links. A disadvantage of the first solution is, inter alia, that this adversely affects the sliding in and sliding out of the mat and adversely affects the manufacture of the modules as injection molding product. A disadvantage of the second solution is, inter alia, that, when negotiating a bend, the contact surfaces of the hinge pin and link slide over each other, so that relatively much wear occurs, for instance in that the links dig into the pin.

SUMMARY OF THE INVENTION

The object of the invention is a modular bend mat of the type indicated in the opening paragraph, which, while maintaining the advantages, avoids the disadvantages mentioned. To that end, the conveyor mat according to the invention includes modules having a plurality of first projections extending in a first direction. Each of the first projections include a hinge hole for receiving a first hinge pin. A plurality of second projections extends in a second direction substantially opposed to the first direction. Each of the second projections include a hinge hole for receiving a second hinge pin. A reinforcement bracket nests with at least a portion of one of the second projections. The reinforcement bracket includes a first hinge hole aligned with the hinge holes in each of the first projections for receiving the first hinge pin. The reinforcement bracket further includes a second hinge hole aligned with the hinge holes in the one of second projections for receiving the second hinge pin.

The foregoing and other objects and advantages of the invention will appear from the following detailed description. In the description, reference is made to the accompanying drawings which illustrate a preferred embodiment of the invention.

BRIEF DESCRIPTION OF THE DRAWINGS

The invention will presently be further elucidated with reference to an exemplary embodiment represented in a drawing. In the drawing.

The Figures only relate to schematic embodiments of preferred embodiments of the invention and therefore only serve as non-limitative exemplary embodiment. In the Figures, identical or corresponding parts are indicated with the same reference numerals.

DETAILED DESCRIPTION OF THE PREFERRED EMBODIMENT

Figure 1:
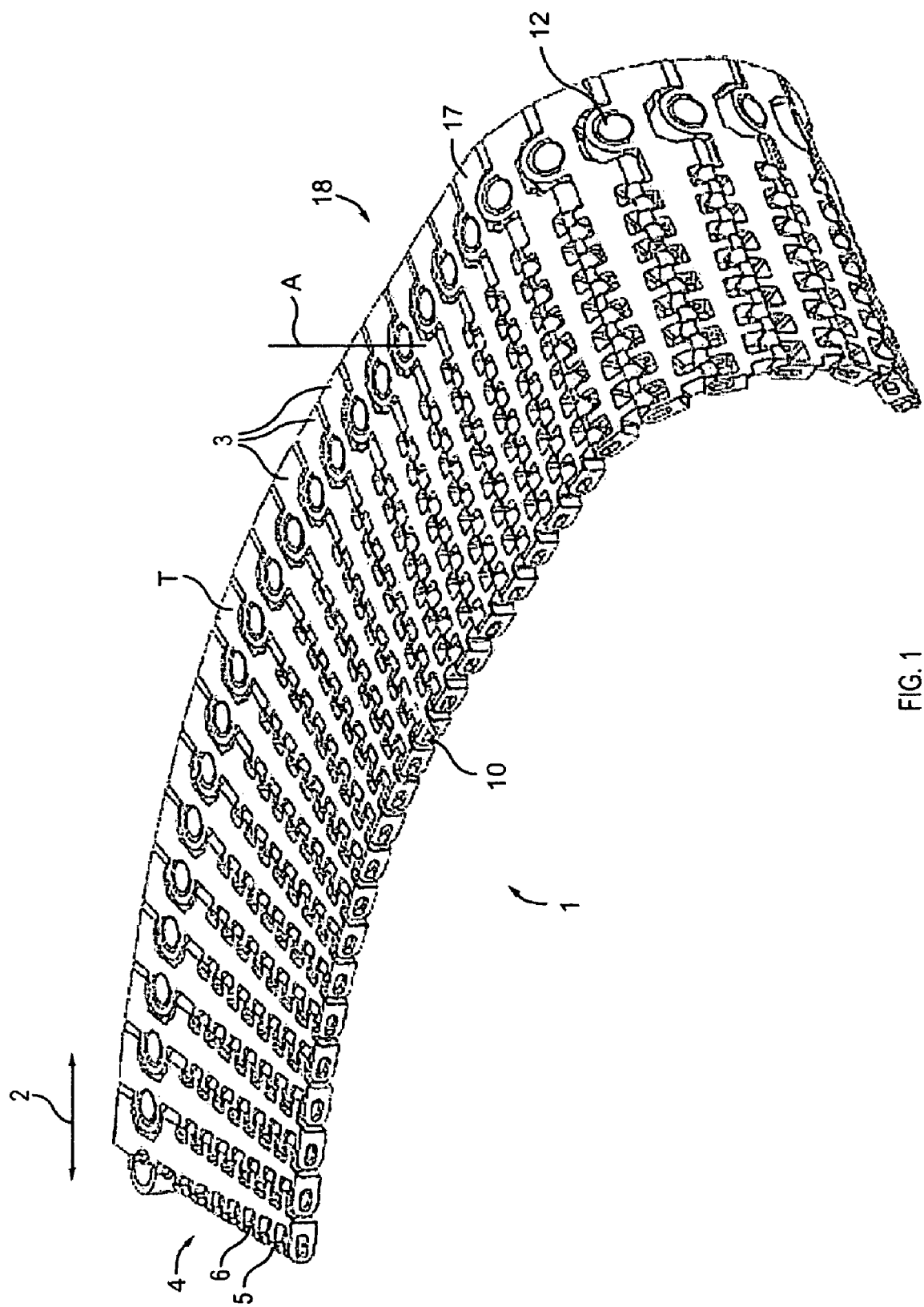
FIG. 1 shows a schematic perspective view of a length of conveyor mat in a first embodiment.
Figure 2:
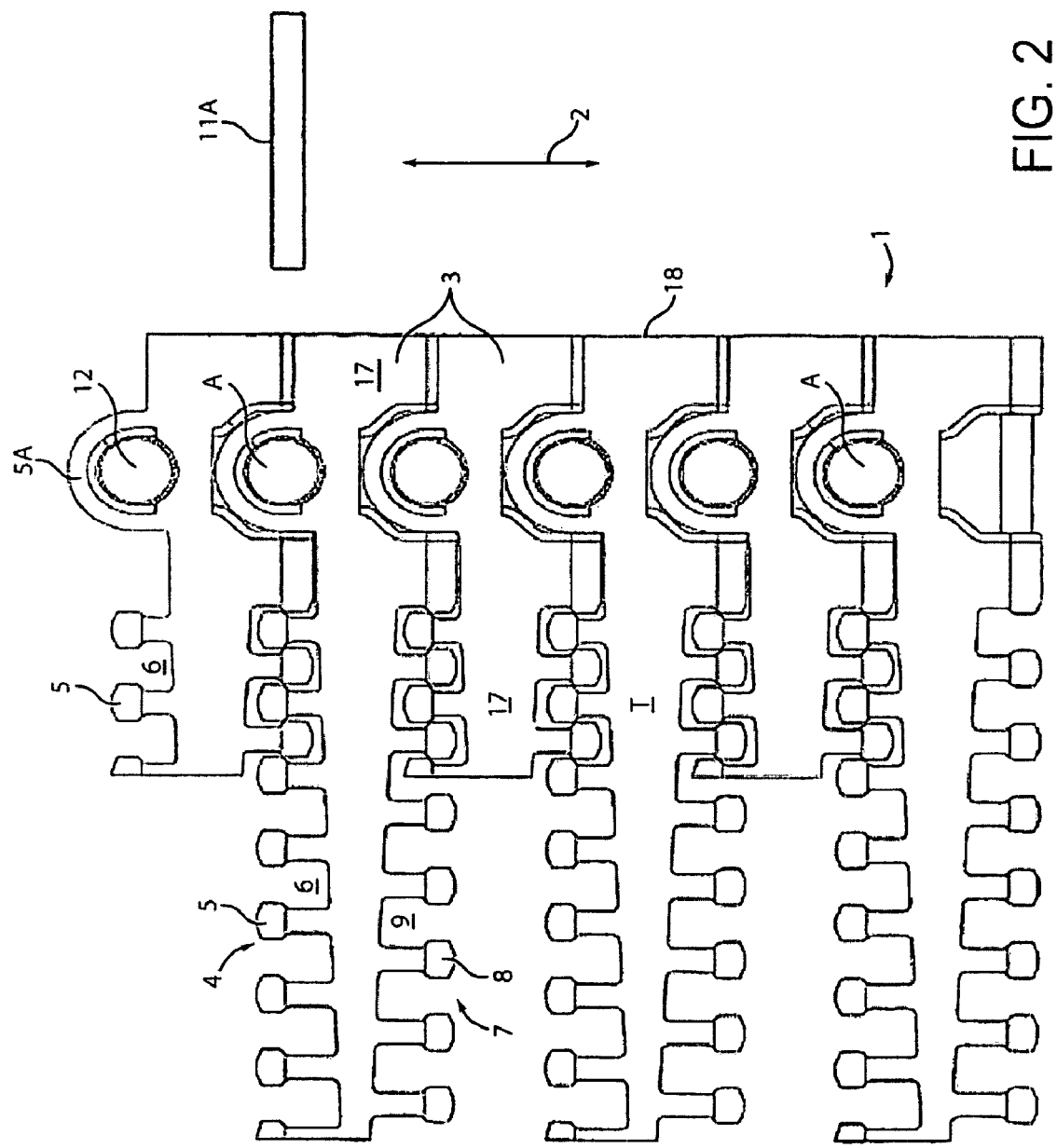
FIG. 2 shows a schematic top plan view of a part of a second embodiment of the conveyor mat.
Figure 3:
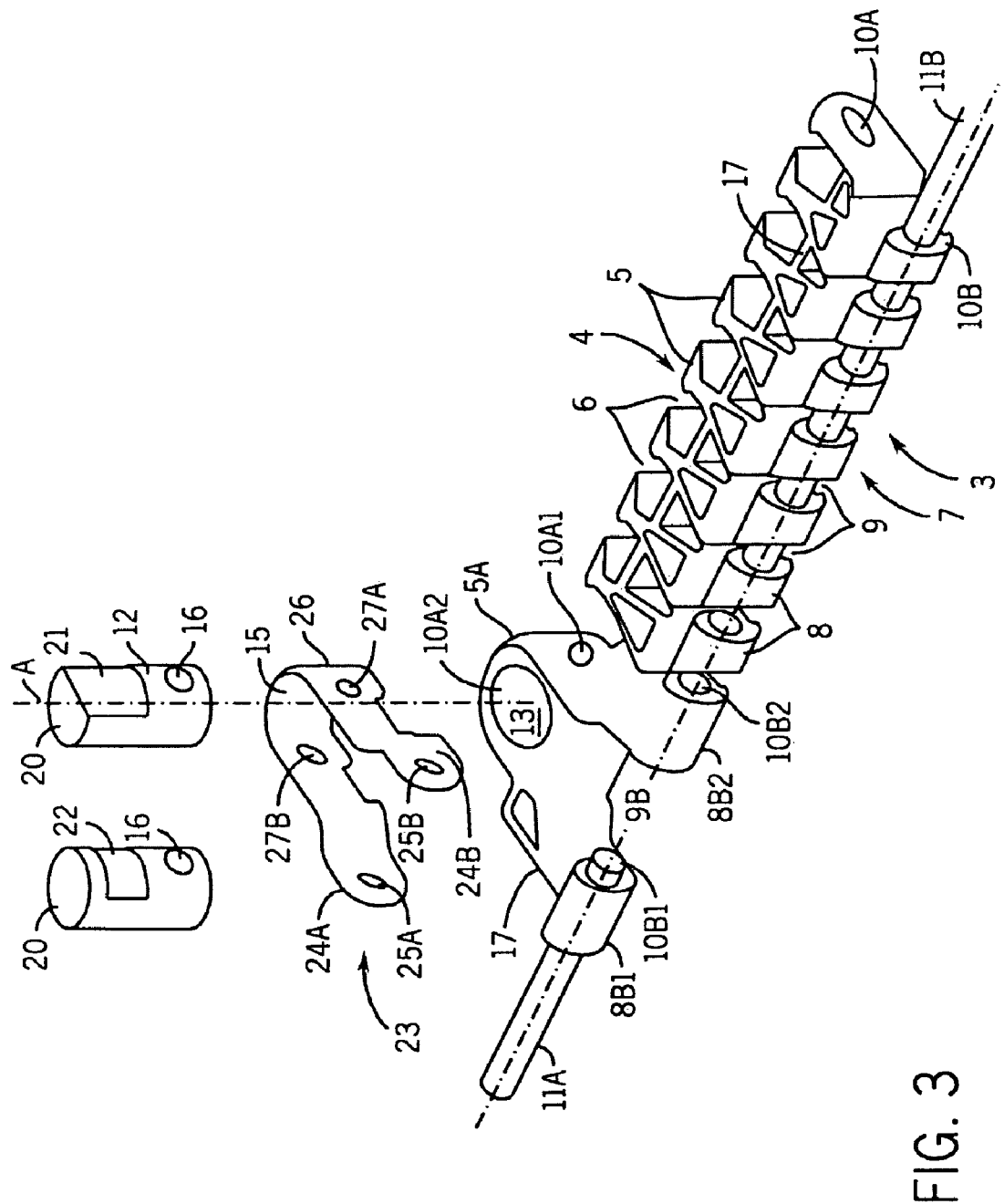
FIG. 3 shows a schematic perspective view of the underside of a module of the conveyor mat of FIG. 1 in taken apart condition.
Figure 4:
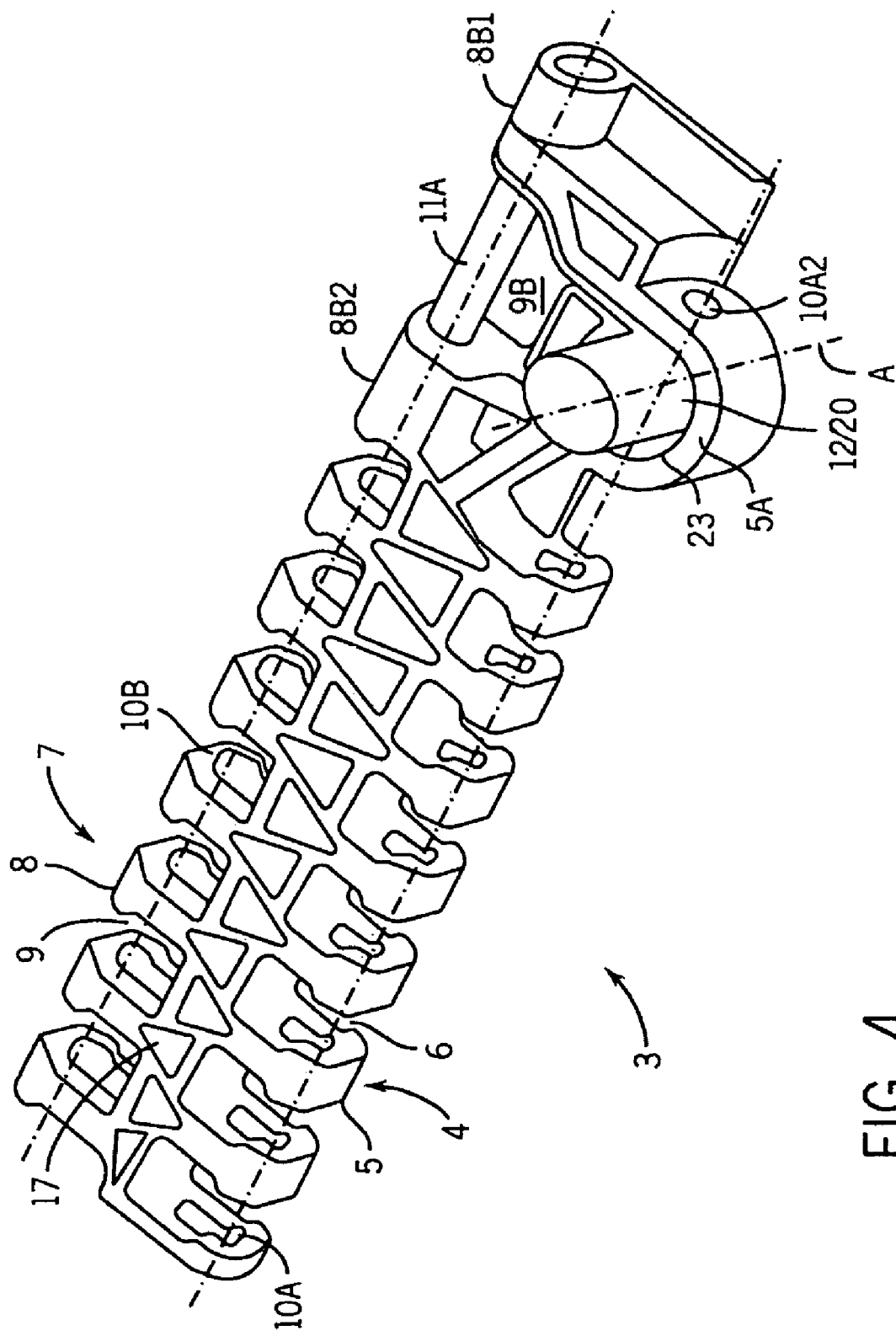
FIG. 4 shows a schematic perspective view of the module of FIG. 3 in composed condition.
Figure 5:
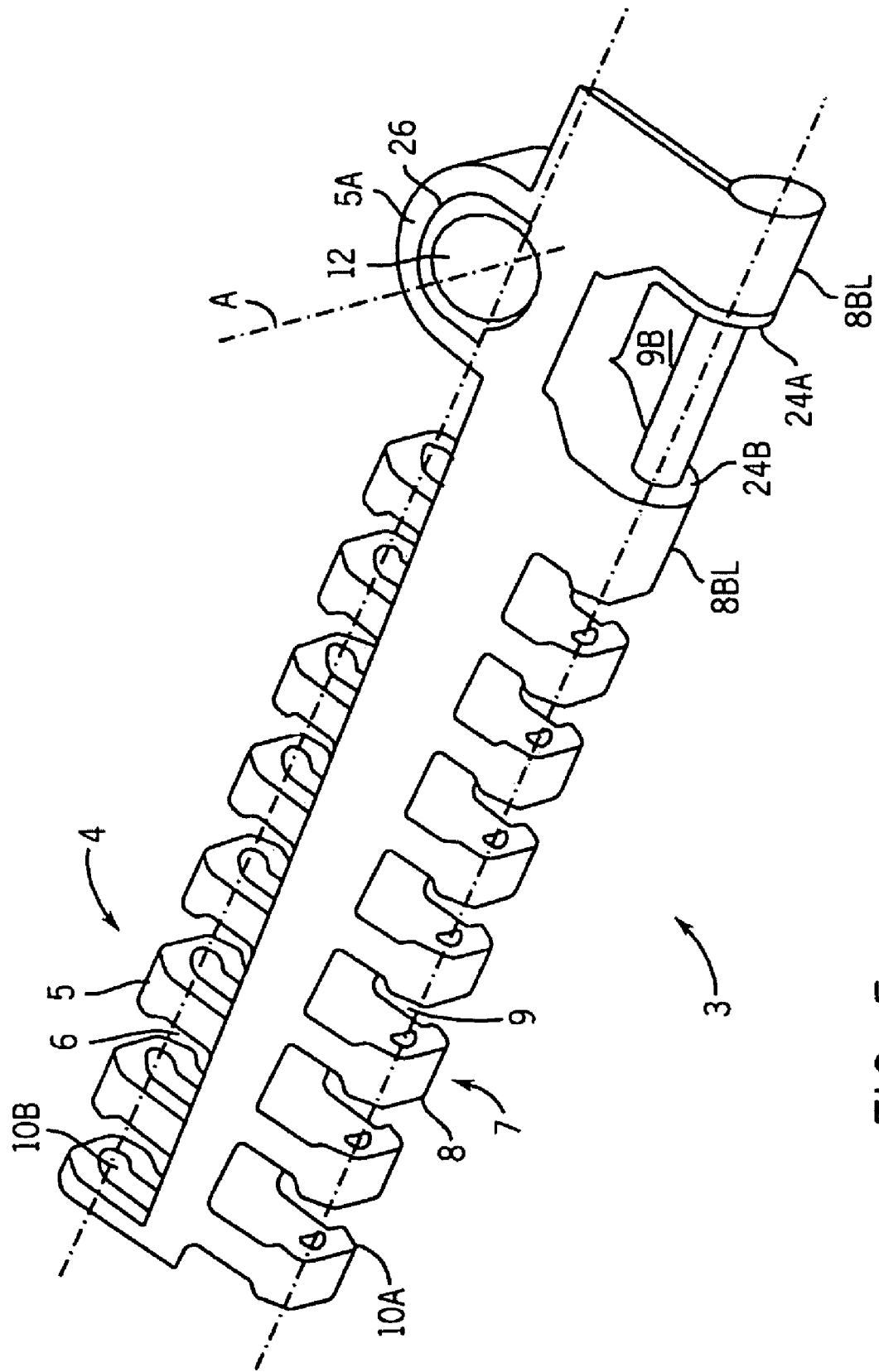
FIG. 5 shows a schematic perspective view of the top side of the module of FIG. 4.

In FIGS. 1 and 2, two exemplary embodiments of modular bend mats according to the invention are represented. Referring to FIG. 1, an assembled conveyor mat 1 is shown, comprising a number of plastic modules 3 successive in a conveying direction indicated with an arrow 2. The plastic modules have been manufactured by means of injection molding and, as can be seen in FIGS. 3-5, are each provided at a front side 4 with a row of forward reaching projections 5 extending transversely to the conveying direction, with recesses 6 located therebetween. Further, at their rear side 7, the modules 3 are provided with a row of backward reaching projections 8 extending transversely to the conveying direction, with recesses 9 located therebetween. As can be seen well in FIG. 1, the projections 5, 8 cooperate with corresponding recesses 6, 9 of successive modules 3. Successive modules 3 are coupled with the aid of hinge pins 11 proceeding transversely to the conveying direction 2. The projections 5, 8 are provided with hinge holes 10, formed by bores extending through the rows of projections, transversely to the conveying direction.

The hinge pins 11 are included with clearance in the hinge holes 10 in the forward reaching projections 5. In this exemplary embodiment, the projections 5 reaching forward are provided with slotted holes 10a as hinge holes, orientated with their longitudinal axis in conveying direction, while the backward reaching projections 8 are provided with cylindrical hinge holes. The outermost central axes through the hinge holes 10a, 10b are in a straight line, extending transversely to the conveying direction. The central axes through hinge holes 10a, 10b run parallel. In this exemplary embodiment, the projections 5, 8 are formed by hinge loops reaching outwards relative to a body part designed as a central carrier 17.

As the hinge pins 11 are included with clearance in the front hinge holes 10A, the projections 5, 8 can slide into and out of the recesses 6, 9, so that the conveying path followed by the modules 3 of the conveyor mat 1 can negotiate a bend in the conveying plane T formed by the top surfaces of the body parts of the modules.

In this exemplary embodiment, the conveyor mat forms an endless belt running on a sprocket wheel. Here, the modules of the mat are guided along a conveying path (not shown). Driving takes place in that the teeth of a number of the sprocket wheels engage drive surfaces provided on the modules. When traveling, the conveyor mat 1 negotiates a bend transversely to the conveying plane in that successive modules can pivot about the hinge pins 11. When traveling a straight part of the conveyor path, the tensile force in the mat is guided through, via hinge pins, over the entire width of the mat from the projections on the edge of one module to the projections on the adjoining edge of the successive module. The mat can then negotiate a bend transversely to the conveying plane as successive modules can pivot about the hinge pins.

Referring to FIG. 3, it is shown in detail that at least one of the hinge pins 11, in this case a short hinge pin 11A, bears an intermediate element 12. The intermediate element 12 is bearing mounted so as to be pivotal relative to a pivot A placed transversely to the hinge pin, in a bearing opening 13 formed in the module 3. The intermediate element 12 is provided with a cylindrical casing surface 14 which cooperates with a correspondingly formed bearing surface 15 of the bearing opening 13 formed in the module 3.

The bearing opening 13 is located at least partly in a forward reaching hinge loop 5A. The bearing opening 13 is enclosed between two hinge holes 10A1, 10A2 of the forward reaching hinge loop 5A which are located on both sides of the bearing opening 13. The short hinge pin 11A is included, secured against rotation, in the hinge holes 10B1, 10B2 of the rearward reaching projections 8B1, 8B2 bounding the recess 9B which cooperates with the forward reaching projection in which the bearing opening 13 is formed. This can for instance be designed with the aid of serrated edges at the ends of the hinge pin 11A. Optionally, the pin 11, when this is of long design, can be fixed in a different hinge hole 10, for instance of a hinge loop which, upon negotiation of a bend in the conveying plane, is located at the inside radius of the mat.

In addition to one of the hinge holes enclosing the bearing opening, a number of further projections provided with hinge holes are provided which complete the row. Advantageously, the bores forming the hinge holes provide a cylindrical abutting surface for cooperation with the cylinder surface of the hinge pin 11.

The intermediate element 12 is provided with a guide cam 20 extending downward relative to the module 3. As shown in FIG. 3, the guide cam can be provided with a beveled guide surface 21. Alternatively, the guide cam 20 can be provided with an idler wheel 22, shown here as a conical wheel bearing mounted about a rotation axis extending substantially downward relative to the module 3.

In FIG. 1 it is shown that the successive modules 3 of the mat are interconnected by the pins 11 via intermediate elements 12 and form a chain extending in conveying direction. The bearing openings 13 and intermediate elements 12 are located adjacent a side edge 18 of the mat.

In FIG. 2, a part of a variant of the conveyor mat is shown in which several modules can be included in the mat transversely to the conveying direction. Here, the modules shown in FIG. 2 are designed as end modules. The modules are further provided with a substantially U-shaped reinforcement bracket 23 surrounding the bearing opening. The free ends 24A, 24B of the reinforcement bracket are provided with holes for cooperation with a hinge pin 11A reaching through the holes 25A, 25B. The holes of the bracket are therefore included in a row of hinge holes 10. In this exemplary embodiment, this is the row of hinge holes 10B of the backward extending projections 8. As shown in FIG. 2, a plurality of modules are assembled forming a partial mat with forward projections 5 extending into recesses 9. Further shown in FIG. 2 are a plurality of reinforcement brackets 23 nesting with portions of backward projections 8.

During assembly, the short hinge pin 11A is fitted through the holes 25 at the free ends 24 of the reinforcement bracket 23, so that during use, the hinge pin 11A and the reinforcement bracket 23 cannot rotate relative to each other. Adjacent the closed end 26 enclosing the bearing opening 13, the reinforcement bracket is provided with oversized holes 27A, 27B. These holes 27 correspond with the oversized holes 10A of the row of forward reaching projections 5 and serve for contactlessly guiding the short hinge pin 11A bearing the intermediate element. The purpose of these holes is to provide space to the hinge pin when it pivots about the pivot A via the intermediate element 2.

The projections are formed by hinge loops reaching outwards relative to a central carrier extending transversely to the conveying direction. In the row of forward reaching hinge loops, oversized hinge holes have been provided, in this exemplary embodiment designed as slotted holes oriented in conveying direction. The backward reaching hinge holes are cylindrical. The hinge holes of both the forward reaching and the backward reaching hinge loops are each in a straight line. The outermost central axes are parallel and therefore have a constant intermediate distance defining the pitch of the module.

In this exemplary embodiment, the body 17 of the module is designed from plastic and the reinforcement bracket 23 is designed from metal. Here, the intermediate element 12 is designed from plastic material, the hinge pin 11A is designed from steel, and the hinge pin 11B is designed from plastic material. It will be clear that the choice of these materials can be different and that the hinge pins 11A, 11B can also be manufactured from one whole, for instance entirely from plastic or entirely from steel.

In this exemplary embodiment, the choice is made to use the closed end of the U-shaped bracket 23 as bearing surface 15 for the intermediate element 12. It will be clear that to this end also, a plastic part of the body 17 of the module 3 can be used, for instance a plastic back surrounded by die bracket 23 or only an opening, recessed in the body 17 while no reinforcement bracket is present.

As is represented in FIG. 2, the mat 1 can be composed by, for instance, alternately interconnecting a series of short and long end modules through insertion of a short pin 11a. Then, by arranging modules 3 brick-wise, a mat 1 of desired width can be made. By including at the other edge a row of short and long customary end modules, i.e. without intermediate elements and bearing openings, the mat can be completed. Naturally, as is represented in FIG. 1, it is also possible to construct a mat comprising only one row of modules transversely to the conveying direction.

When negotiating a bend, the hinge loops and the recesses located at the inside of the bend slide into each other, to then slide out of each other after having negotiated the bend. In the embodiment shown, the modules cannot slide into each other at the location of the outside radius of the conveying mat. Depending on the driving direction of the mat, the conveying direction of the mat proceeds in a direction indicated with the double arrows 2 and the conveying mat can negotiate a bend to the left or to the right in the conveying direction. In this connection it is noted that the terms front and back as used in this application can be exchanged.

When it is desired that the mat can negotiate bends in two directions in the conveying plane in a conveying direction, the chain of intermediate elements can be provided in the center of the mat, for instance by providing a special center module. Such a module can for instance be made by designing the modules represented so as to be double, through mirroring about the pivot of the bearing opening and having the pitch between the hinge holes increase from the intermediate element when the modules travel transversely to the conveying direction.

It is noted that the invention is not limited to the embodiments described here, but that many variants are possible within the range of the invention as outlined by the following claims.

The invention claimed is:

1. A conveyor module comprising:
   a plurality of first projections extending in a first direction, each of said first projections including a hinge hole for receiving a first hinge pin;
   a plurality of second projections extending in a second direction substantially opposed to said first direction, each of said second projections including a hinge hole for receiving a second hinge pin; and
   a reinforcement bracket nesting with at least a portion of one of said second projections, said reinforcement bracket including a first hinge hole aligned with said hinge holes in each of said first projections for receiving said first hinge pin, said reinforcement bracket further including a second hinge hole aligned with said hinge holes in said one of second projections for receiving said second hinge pin.

2. The conveyor module as in claim 1, in which said one of said second projections includes an outer surface facing said second direction and an inner surface facing said first direction, said reinforcement bracket nesting against said inner surface.

3. The conveyor module as in claim 1, in which said one of said second projections is offset from a lateral center of said module.

4. The conveyor module as in claim 1, in which said reinforcement bracket is U-shaped having free ends joined by a closed end, said first hinge hole being formed in one of said free ends for receiving said first hinge pin.

5. The conveyor module as in claim 4, in which said second hinge hole is formed in said closed end for receiving said second hinge pin.

6. The conveyor module as in claim 1, in which said one of said second projections includes a bearing opening.

7. The conveyor module as in claim 6, including an intermediate element received in said bearing opening.

8. The conveyor module as in claim 7, in which said intermediate element includes a guide cam extending downwardly from said one of said second projections.

9. The conveyor module as in claim 1, in which said reinforcement bracket is separable from said one of said second projections.

10. A conveyor module comprising:
    a plurality of first projections extending in a first direction, each of said first projections including a hinge hole for receiving a first hinge pin;
    a plurality of second projections extending in a second direction substantially opposed to said first direction, each of said second projections including a hinge hole for receiving a second hinge pin; and
    a reinforcement bracket including a first hinge hole aligned with said hinge holes in each of said first projections for receiving said first hinge pin, said reinforcement bracket further including a second hinge hole aligned with said hinge holes in said one of second projections for receiving said second hinge pin, one of said reinforcement bracket and one of said second projections wrapping around the other of said reinforcement bracket and said one of said second projections.

11. The conveyor module as in claim 10, in which said one of said second projections wraps around said reinforcement bracket.

12. The conveyor module as in claim 10, in which said one of said second projections is offset from a lateral center of said module.

13. The conveyor module as in claim 10, in which said reinforcement bracket is U-shaped having free ends joined by a closed end, said first hinge hole being formed in one of said free ends for receiving said first hinge pin.

14. The conveyor module as in claim 13, in which said second hinge hole is formed in said closed end for receiving said second hinge pin.

15. The conveyor module as in claim 10, in which said one of said second projections includes a bearing opening.

16. The conveyor module as in claim 15, including an intermediate element received in said bearing opening.

17. The conveyor module as in claim 16, in which said intermediate element includes a guide cam extending downwardly from said one of said second projections.

18. The conveyor module as in claim 10, in which said reinforcement bracket is separable from said one of said second projections.

19. The conveyor module as in claim 10, in which said reinforcement bracket is a metal reinforcement bracket.

* * * * *

UNITED STATES PATENT AND TRADEMARK OFFICE
CERTIFICATE OF CORRECTION

PATENT NO. : 7,690,501 B2  Page 1 of 1
APPLICATION NO. : 12/050377
DATED : April 6, 2010
INVENTOR(S) : Menke et al.

It is certified that error appears in the above-identified patent and that said Letters Patent is hereby corrected as shown below:

Column 5, line 8 "die" should be changed to -- the --

Signed and Sealed this

First Day of June, 2010

David J. Kappos
*Director of the United States Patent and Trademark Office*